Patented June 15, 1971

3,585,165

3,585,165
POLYOXYMETHYLENE COPOLYMERS STABILIZED WITH 3,5-DIAMINO-1,2,4-TRIAZOLE

Dieter Gerlach, Grossauheim, and Erich Bader, Hanau am Main, Germany, assignors to Deutsche Gold- und Silber-Scheideanstalt vormals Roessler, Frankfurt am Main, Germany
No Drawing. Filed Jan. 23, 1969, Ser. No. 793,555
Claims priority, application Germany, Jan. 27, 1968, D 55,204
Int. Cl. C08g 51/60
U.S. Cl. 260—45.8
10 Claims

ABSTRACT OF THE DISCLOSURE

Polyoxymethylene copolymers containing alkyleneoxy groups having at least two adjacent carbon atoms in the main chain have their properties improved, particularly at high temperatures, by admixing with 3,5-diamino-1,2,4-triazole. For use in air conventional antioxidants, preferably phenols are also included in the composition.

---

The present invention relates to polyoxymethylene copolymers having improved properties.

It is known to use dicyandiamide and its substitution products, poly (4-amino-1,2,4-triazole), amino derivatives of symmetrical triazine and imidazoline. Furthermore it is known to stabilize trioxane copolymers with certain imidazolidone-2 derivatves together with known phenolic antioxidants.

For the manufacture of copolymers in the above-mentioned ways, however, it is necessary to use a high temperature. In general the manufacturing temperature is between 180 and 230° C. It is desired to enlarge this temperature range in the upper end.

However, the action of the known additives is not satisfactory at high temperatures. This is especially true if the polymerizates are exposed for a long time at high temperatures, particularly if these temperatures lie above 240° C.

Thus, for example, imidazolidone-2 vaporizes at higher temperatures with a brown coloration, while dicyandiamide polymerizes by heating to 240° C. Others of the known stabilizers as, for example, melamine have too high a melting point and therefore are difficult to work into the copolymer. Frequently discoloration occurs.

According to the invention there is added 3,5-diamino-1,2,4-triazole it is possible to work the polyoxymethylene copolymers at optimum higher temperatures, for example, up to 255° C., without being afraid of deterioration of the stability during the working and subsequently. Above all a longer lasting thermal requirement of the copolymer is not tied to a lowering of the stability. Additionally the 3,5-diamino-1,2,4-triazole is readily worked into the polyoxymethylene copolymer.

The 3,5-diamino-1,2,4-triazole especially causes a stabilization against breakdown due to heat.

If the polyoxymethylene copolymerizate prepared as above is to be used in the presence of oxygen or hot air, it is necessary to use the 3,5-diamino-1,2,4-triazole in combination with an antioxidant.

There can be used the known antioxidants for formaldehyde or trioxane, as for example phenols, especially those which carry substituents ortho or para to the phenol groups. Especially suited are bisphenols, e.g. 2,2-methylene-bis-(4-methyl-6-tert. butylphenol). There can also be used other phenols such as 2-methyl-4,6-di-tert. butyl phenol, 2,2′-methylene bis-(5-methyl-6-tert. butyl phenol), 4,4′-butylidene bis-(6-tert. butyl-3-methyl phenol), 2,6-di-tert. butyl-4-methyl phenol, p-octyl phenol, p-phenyl phenol; 2,3-dihydroxy naphthalene, 2,2-methylene-bis(4-ethyl-6-tert. butyl phenol), 2,6-di-tert. butyl-p-cresol, 2,6-dimethyl-4-tert. butyl phenol, polyphenols, e.g. a condensation product of 4-tert. butyl phenol and formaldehyde, 2,2′-ethylene-bis-(4-methyl-6-tert. butyl phenol).

Other known antioxidants can be used such as aromatic amines, e.g. N-phenyl-1-naphthylamine, diphenyl amine, di-2-naphthyl p-phenylene diamine, N-phenyl beta naphthylamine.

The additive (or additive mixtures) of the invention bestows on polyoxymethylene copolymers (for example formaldehyde copolymers) a continuous working temperature not previously reached lying above 240° C. Thus, for example, a copolymer of polyoxymethylene with 3% of 1,3-dioxepane which contains 3,5-diamino-1,2,4-triazole and 2,2-methylene bis-(4-methyl-6-tert. butylphenol) can be heated to 255° C. by injection molding without discoloration occurring in the necessary time for working.

The additive (or additive mixtures) of the invention is easy to use. It suffices to simply mechanically mix it with the polymer. It can also be worked into the polymer, however, in any other manner. The 3,5-diamino-1,2,4-triazole as well as the antioxidant can be added in an amount between 0.01 and 10% based on the polymer. The two components of the additive mixture can be added separately or together in any processing phase after the polymerization reaction. The antioxidant can consist of a single compound or a mixture of antioxidants can be employed.

Unless otherwise indicated all parts and percentages are by weight.

As polyoxymethylene copolymers there are included copolymers of formaldehyde or lower oligomers of formaldehyde which contain in the main chain alkyleneoxy groups with at least two adjacent carbon atoms. The copolymers preferably are of high molecular weight. The alkylenoxy groups can make up 0.1 to 50% of the total polymer. It is desirable that the polymer possesses a reduced specific viscosity of more than 0.1, measured in a 0.5% solution in dimethyl formamide in the presence of 0.5% of diphenylamine based on the polymer. As a lower condensation product of formaldehyde, trioxane is especially useful. The high molecular weight polyoxymethylene copolymers of the above-mentioned type are produced in conventional fashion through cationic polymerization of formaldehyde or lower condensation productions of formaldehyde, such as trioxane, in the presence of Lewis acids such as $BF_3$, $SbF_3$, $SbF_5$, $SnCl_4$, $FeCl_3$, $ZnF_2$, $SbCl_5$, $AlCl_3$, $TiCl_4$, boron trifluoride etherates, e.g. boron trifluoride diethyl etherate, boron trifluoride diamyl etherate, or in the presence of alkyl or acyl perchlorates, e.g. tert. butyl perchlorate, acetyl perchlorate, succinyl perchlorate.

Preferably comonomers are for example cyclic ethers, as for example ethylene oxide, propylene oxide, 1,2-butylene oxide, glycide ether, styrene oxide, cyclohexene oxide, tetra hydrofurane, oxetane, 3,3-dimethyl oxetane, 3,3-dichloromethyl oxetane, cyclohexene oxide, and cyclic fomals of aliphatic diols as for example ethylene glycol, 1,4-butane diol, propylene glycol, neopentyl glycol or diethylene glycol. Examples of cyclic formals include dioxolane, meta dioxane, 4-phenyl-1,3-dioxane, 2-phenyl dioxolane, 1,3-dioxa cycloheptane, 1,3,5-trioxepane, 1,3,6-trioxacyclooctane and neopentyl formal. The polyoxymethylene copolymers may also be produced by polymerizing formaldehyde or lower oligomers of formaldehyde in the presence of a prepolymeric compound such as polydioxolane or copolymers of trioxane with dioxolane or ethylene oxide.

The procedure of the invention is used principally to improve the properties of all copolymers of the above-mentioned type, even those with unstable chain ends. However, it is advantageous if the polymerizate already possesses a certain stability before the stabilization and, for example, undergoes a weight loss of less than 20% after four hours heating in a nitrogen atmosphere.

The 3,5-diamino-1,2,4-triazole can also be combined with other stabilizers such as carbonamides, polyamides and light stabilizers. Examples of such stabilizers include urea, dicyandiamide, thiourea, ethylene urea, phenyl urea, melamine, phenyl thiourea, 2,2'-dihydroxy-4,4'-dimethoxy benzophenone and 2-hydroxy-4-methoxy benzophenone, condensation product of N,N'-dihydroxymethyl isophalic acid diamide with imidazolidone-2 and cyanoguanidine as well as the other condensation products disclosed in German Patent 1,173,245 on column 2, lines 1–44 and column 4, lines 40–65, column 5, lines 36–41, column 6, lines 38– 54, column 7, lines 21–34 and column 8, lines 1–15.

From the copolymers improved by the addition of 3,5-diamino-1,2,4-triazole there can be produced technically valuable plastics and industrial materials such as films, injection molding compositions, fibers and profiled objects.

EXAMPLE 1

97 grams of trioxane and 3 grams of 1,3-dioxepane were block copolymerized with $7.5 \cdot 10^{-5}\%$ of tert. butyl perchlorate as a catalyst and the polymer obtained subjected to a hydrolytic breakdown in conventional manner to remove the half acetal hydroxyl end groups. (The weight loss of the copolymer thus prepared was 3.8% after heating at 220° C. for 4 hours in nitrogen.) 25 grams of this copolymer were mixed in a mill for an hour at 180° C. with 0.2% of 2,2-methylene-bis-(4-methyl-6-tert. butyl phenol) as an antioxidant and 0.8% of 3,5-diamino-1,2,4-triazole. In parallel tests the same amount of known stabilizers were mixed in the same manner with 25 grams of the copolymer and 0.2% of the same phenolic antioxidant. To determine the thermal stability 200 mg. samples were heated at 220° C. for 45 minutes with the introduction of air and the percent weight loss measured after cooling. The results are set forth in Table I.

TABLE I

| Additive: | Percent weight loss |
|---|---|
| None | 30.8 |
| 3,5-diamino-1,2,4-triazole | 1.1 |
| Ethylene urea | 1.4 |
| Dicyandiamide | 1.9 |
| Melamine | 3.1 |

EXAMPLE 2

97 grams of trioxane and 3 grams of 1,3-dioxepane were block copolymerized with $7.5 \cdot 10^{-5}$ of tert. butyl perchlorate as a catalyst and the polymer obtained subjected to a hydrolytic breakdown in conventional manner to remove the half acetal hydroxyl end groups. (The weight loss of the copolymer prepared was 10.6% after heating for 4 hours at 220° C. in nitrogen.)

25 grams of this copolymer were mixed in a mill for an hour at 180° C. with 0.2% of 2,2-methylene-bis-(4-ethyl-6-tert. butyl phenol) as an antioxidant and 0.8% of 3,5-diamino-1,2,4-triazole. Parallel Thermostability tests were carried out as in Example 1 replacing the triazole by the same amount of the indicated known stabilizers. The stability was determined on 200 mg. samples heated at 220° C. for 45 minutes in air followed by cooling and determining the weight loss. The results are set forth in Table II.

TABLE II

| Additive: | Percent weight loss |
|---|---|
| None | 70 |
| 3,5-diamino-1,2,4-triazole | 2.1 |
| Ethylene diurea | 3.4 |
| Dicyandiamide | 3.1 |
| Melamine | 4.7 |

EXAMPLE 3

A copolymer was produced in conventional fashion from 97.25 parts of trioxane and 2.75 parts of 1,3-dioxepane using $7.10^{-5}\%$ of tert.butyl perchlorate as a catalyst. The polymer was subjected to hydrolytic breakdown as in Example 1. (The weight loss after 2 hours heating in nitrogen at 220° C. was 1.43%.)

5 grams of the copolymer was homogeneously mixed in molten condition in an extruder (Fabrikat Bandera, 3-zone short compression screw, length 25 times diameter, diameter 60 mm.) with 0.4% of 2,2-methylene-bis-(4-methyl-6-tert. butyl phenol) as an antioxidant together with 0.5% of the additives indicated in Table III. The only variable was the type of additive.

From the table the superiority of 3,5-diamino-1,2,4-triazole (or mixtures thereof with the antioxidant 2,2-methylene-bis(4-methyl-6-tert. butyl phenol) over the most important representatives of the known additives is clearly recognizable.

TABLE III

| Additive | 120 min. 220° C. in N₂ | Percent weight loss 60 min. 220° C. in air | 120 min. 220° C. in air | Color of the sample after 60 min. at 220° C. in air |
|---|---|---|---|---|
| 3,5-diamino-1,2,4-triazole | 0.18 | 0.18 | 0.84 | White. |
| Imidazolidone-2 | 0.83 | 0.97 | 2.24 | Yellowish. |
| 1,1-ethylene-bis-imidazolidone-2 | 0.95 | 0.80 | 1.49 | Do. |
| Cyanoguanidine | 0.36 | 0.40 | 1.43 | Yellow. |
| Condensation product of N,N'-dihydroxymethylisophthalic-acid diamide with imidazolidone-2 | 0.41 | 0.40 | 1.16 | Yellowish. |
| Melamine | 0.48 | 0.28 | 0.87 | White, inhomogeneous. |
| Urea | 1.35 | 0.78 | 2.12 | Brown. |
| Poly-(4-amino-1,2,4-triazole) made from sebacic acid dihydrazide | 1.24 | 1.06 | 2.04 | Yellow, inhomogeneous. |
| Poly-(4-amino-1,2,4-triazole) made from isophthalic acid dihydrazide | 0.87 | 0.91 | 1.87 | Do. |

EXAMPLE 4

A copolymer produced through the polymerization of 97 parts trioxane and 3 parts dioxolane with $1.63 \cdot 10^{-3}\%$ BF₃-dibutyl etherate as a catalyst was subjected to an exhaustive hydrolytic breakdown. The weight loss of the resulting copolymer after 2 hours heating at 220° C. in nitrogen amounted to only 0.3%.

The material in molten form was homogeneously mixed with 0.4% of 2,2-methylene-bis-(4-methyl-6-tert. butyl phenol) as an antioxidant and with 0.5% of 3,5-diamino-1,2,4-triazole with the aid of a single roll screw extruder.

Then the weight loss was measured after heating of samples at 220° C. for one, two, three and five hours with the introduction of air. The same tests were carried out replacing the 3,5-diamino-1,2,4-triazole by an equal weight of the condensation product of N,N'-dihydroxymethyl-isophthalic acid diamide and imidazolidone-2 (see German Pat. 1,173,245). The results are set forth in in Table IV.

As is shown by the table the 3,5-diamino-1,2,4-triazole containing sample had better thermal stability even after a long time than did the comparative material.

TABLE IV

| Hours | Percent weight loss [1] | | | |
|---|---|---|---|---|
| | 1 | 2 | 3 | 5 |
| Additive: | | | | |
| 3,5-diamino-1,2,4-triazole | 0.1 | 0.3 | 0.9 | 1.6 |
| Condensation product from N,N'-dihydroxymethyl-isophthalic acid diamide and imidazolidone-2 | 0.3 | 0.6 | 1.5 | 2.0 |

[1] After heating to 220° C. with the introduction of air.

EXAMPLE 5

A copolymer produced through the polymerization of 97.25 parts of trioxane and 2.75 parts of 1,3-dioxepan with $1.7 \cdot 10^{-3}\%$ $BF_3$-dibutyl etherate as a catalyst was subjected to a conventional hydrolytic degradation. The weight loss after two hours heating of a sample in nitrogen at 220° C. was 1.3%.

5 kilograms of the material in molten form was homogeneously mixed with 0.4% of 2,2-methylene-bis-(4-methyl-6-tert. butyl phenol) as an antioxidant and with 0.5% of an additive with the aid of a single roll screw extruder. The only variable was in the type of additive. Injection molded pieces were produced continuously under identical machine conditions in an injection cycle of 2 minutes from the granules obtained. From each granule 40 pieces were obtained. The temperature of the mass in the machine was held constant at the high temperature of 250° C.

As is shown in Table V only the injection molded pieces which were produced from the granules containing 3,5-diamino-1,2,4-triazole were of an unobjectionable color and nearly free of formaldehyde odor.

TABLE V

| Additive | Color of the injection molded pieces | Odor of the injection molded pieces |
|---|---|---|
| 3,5-diamino-1,2,4-triazole | White-ivory color | Almost odorless. |
| Cyanoguanidine | Brown | Do. |
| Imidazolidone-2 | Ivory color | Strong formaldehyde odor. |
| Condensation product of N,N'-dihydroxy-methyl-isophthalic acid diamide with imidazolidone-2. | Yellowish | Do. |

EXAMPLE 6

Improved high temperature properties are also obtained if the 3,5-diamino-1,2,4-triazole is used without the phenolic antioxidant. A copolymer produced through polymerization of 15 parts of trioxane and 5 parts of 1,3-dioxepane with $1.75 \cdot 10^{-3}\%$ $BF_3$ dibutyl etherate as a catalyst was subjected to an hydrolytic breakdown. The weight loss of the resulting copolymer after 2 hours heating at 220° C. in nitrogen was 2.9%.

The material was then mixed with various stabilizers by suspending the powdered polymer in a solution of the stabilizers in dimethyl formamid and drying.

Then the weight loss was measured after heating of samples at 220° C. for two hours with the introduction of air. The results are set forth in Table VI.

Table VI

| Additive: | Percent weight loss after 120 min. at 220° C. in air |
|---|---|
| — | 32.0 |
| 0.5% 3,5-diamino-1,2,4-triazole | 24.3 |
| 0.4% 4.4-methylene-bis-(2,6-di-tert. butyl phenol) | 12.1 |
| 0.5% 3,5-diamino-1,2,4-triazole + 0.4% 4,4-methylene-bis-(2,6-di-tert. butyl phenol | 4.8 |

What is claimed is:

1. A mixture of (a) a polyoxymethylene copolymer containing alkyleneoxy groups having at least two adjacent carbon atoms in the main chain with (b) 3,5-diamino-1,2,4-triazole.

2. A mixture as in claim 1 wherein the alkyleneoxy groups are 0.1 to 50% by weight of the copolymer and the triazole is present in an amount of 0.01 to 10% of the copolymer by weight.

3. A mixture according to claim 2 wherein the copolymer is a copolymer of formaldehyde with a member of the group consisting of 1,3-dioxepane and dioxolone.

4. A mixture according to claim 2 wherein the triazole is present in an amount of 0.1 to 3%.

5. A mixture according to claim 2 wherein the alkyleneoxy groups are derived from 1,3-dioxepane.

6. A mixture according to claim 2 wherein the alkyleneoxy groups are derived from dioxolane.

7. A mixture according to claim 2 also containing 0.1 to 10% by weight of the copolymer of an antioxidant which is a phenol containing only carbon, hydrogen and oxygen.

8. A mixture according to claim 7 also containing 0.1 to 10% by weight of the copolymer of an antioxidant which is a bisphenol.

9. A mixture according to claim 7 also containing 0.01 to 10% by weight of the copolymer of an antioxidant which is an alkyl phenol.

10. A mixture according to claim 2 also containing 0.01 to 10% by weight of the copolymer of an antioxidant which is an aromatic amine.

References Cited

UNITED STATES PATENTS

| 3,297,627 | 1/1967 | Hermann et al. | 260—45.8 |
| 3,313,767 | 4/1967 | Berardinelli et al. | 260—45.8 |
| 3,316,207 | 4/1967 | Hermann et al. | 260—45.8 |
| 3,394,102 | 7/1968 | Wakasa et al. | 260—45.8 |
| 3,424,819 | 1/1969 | Green | 260—857 |

DONALD E. CZAJA, Primary Examiner

R. A. WHITE, Assistant Examiner

U.S. Cl. X.R.

260—45.9, 45.95